(12) United States Patent
Kaji et al.

(10) Patent No.: US 12,540,907 B2
(45) Date of Patent: Feb. 3, 2026

(54) SORTING SUPPORT APPARATUS, SORTING SUPPORT SYSTEM, SORTING SUPPORT METHOD, AND PROGRAM

(71) Applicant: NEC Corporation, Tokyo (JP)

(72) Inventors: Masahiro Kaji, Tokyo (JP); Kazuyuki Ikemura, Tokyo (JP); Shinichi Yoshitsune, Tokyo (JP); Kaori Takeuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 167 days.

(21) Appl. No.: 18/381,380

(22) Filed: Oct. 18, 2023

(65) Prior Publication Data

US 2024/0044817 A1 Feb. 8, 2024

Related U.S. Application Data

(63) Continuation of application No. 16/971,715, filed as application No. PCT/JP2019/013547 on Mar. 28, 2019, now abandoned.

(30) Foreign Application Priority Data

Mar. 29, 2018 (JP) .................................. 2018-066026

(51) Int. Cl.
*G01N 23/10* (2018.01)
*G01N 23/04* (2018.01)
(Continued)

(52) U.S. Cl.
CPC .............. *G01N 23/10* (2013.01); *G01N 23/04* (2013.01); *G01N 23/083* (2013.01); *G06N 5/04* (2013.01);
(Continued)

(58) Field of Classification Search
CPC ........ G01N 23/10; G01N 23/06; G01N 23/04; G01N 23/02; G01N 23/083; G01N 23/00;
(Continued)

(56) References Cited

U.S. PATENT DOCUMENTS 5,367,552 A * 11/1994 Peschmann ........... G06T 7/0004
378/57
6,546,071 B2 4/2003 Graves
(Continued)

FOREIGN PATENT DOCUMENTS

CN 206192923 U 5/2017
JP 2007-517275 A 6/2007
(Continued)

OTHER PUBLICATIONS

US Office Action for U.S. Appl. No. 18/380,886, mailed on Mar. 20, 2025.

(Continued)

*Primary Examiner* — Mohamed Charioui
(74) *Attorney, Agent, or Firm* — Sughrue Mion, PLLC (57) ABSTRACT

A sorting support apparatus is provided with: an input part that inputs a transmission image obtained by radiating an inspection target with electromagnetic waves; a storage part that stores a plurality of learning models optimized respectively for at least one article and being associated with an assumed usage condition; and a determination part that selects one of the learning models based on a specified usage condition and uses the learning model to determine whether or not the one or more articles is contained in the inspection target.

9 Claims, 11 Drawing Sheets

(51) Int. Cl.
   *G01N 23/083*  (2018.01)
   *G06N 5/04*    (2023.01)
   *G06N 20/00*   (2019.01)
   *G06V 20/52*   (2022.01)

(52) U.S. Cl.
   CPC ............. *G06N 20/00* (2019.01); *G06V 20/52* (2022.01); *G01N 2223/04* (2013.01); *G01N 2223/401* (2013.01); *G01N 2223/639* (2013.01)

(58) Field of Classification Search
   CPC ......... G01N 2223/04; G01N 2223/401; G01N 2223/639; G01N 2223/00; G06N 5/04; G06N 5/00; G06N 20/00; G06V 20/52; B07C 5/346; B07C 5/34; B07C 5/00; G06T 7/00
   See application file for complete search history.

(56) References Cited

U.S. PATENT DOCUMENTS

| | | | |
|---|---|---|---|
| 7,405,692 | B2 | 7/2008 | McMakin et al. |
| 8,369,481 | B2 | 2/2013 | Shimada |
| 8,451,974 | B2 | 5/2013 | Morton |
| 8,867,816 | B2* | 10/2014 | Bouchard ................. G06T 7/00 382/101 |
| 8,885,794 | B2 | 11/2014 | Morton |
| 9,158,030 | B2 | 10/2015 | Morton |
| 9,170,212 | B2 | 10/2015 | Bouchard et al. |
| 9,606,259 | B2 | 3/2017 | Morton |
| 10,074,166 | B2 | 9/2018 | Kang et al. |
| 10,124,682 | B2 | 11/2018 | Tsuchiya |
| 10,134,254 | B2 | 11/2018 | Jarvi et al. |
| 10,710,119 | B2* | 7/2020 | Kumar ..................... G06N 3/08 |
| 10,713,914 | B2 | 7/2020 | Jarvi et al. |
| 11,163,939 | B2 | 11/2021 | Ito |
| 2002/0012419 | A1 | 1/2002 | Graves |
| 2004/0090359 | A1 | 5/2004 | McMakin et al. |
| 2009/0226032 | A1 | 9/2009 | Merzbacher et al. |
| 2010/0150308 | A1 | 6/2010 | Tsuno et al. |
| 2010/0208972 | A1 | 8/2010 | Bouchard et al. |
| 2010/0310043 | A1* | 12/2010 | Shimada .............. G01N 23/083 378/57 |
| 2011/0019797 | A1 | 1/2011 | Morton |
| 2013/0336447 | A1 | 12/2013 | Morton |
| 2014/0211980 | A1 | 7/2014 | Bouchard et al. |
| 2014/0376686 | A1 | 12/2014 | Dreiseitel et al. |
| 2015/0110240 | A1 | 4/2015 | Morton |
| 2016/0189360 | A1 | 6/2016 | Kang et al. |
| 2016/0231454 | A1 | 8/2016 | Morton |
| 2016/0232769 | A1 | 8/2016 | Jarvi et al. |
| 2016/0335503 | A1* | 11/2016 | Zhang ..................... G06F 18/00 |
| 2017/0050527 | A1 | 2/2017 | Tsuchiya |
| 2017/0140526 | A1* | 5/2017 | Chen ................... G06Q 30/018 |
| 2018/0038988 | A1 | 2/2018 | Morton |
| 2019/0139385 | A1 | 5/2019 | Jarvi et al. |
| 2019/0197090 | A1 | 6/2019 | Ito |

FOREIGN PATENT DOCUMENTS

| | | |
|---|---|---|
| JP | 2010-540930 A | 12/2010 |
| JP | 2012-068965 A | 4/2012 |
| JP | 2012-137387 A | 7/2012 |
| JP | 2016-208408 A | 12/2016 |
| JP | 2017-041984 A | 2/2017 |
| JP | 2017-509903 A | 4/2017 |
| JP | 2017-224925 A | 12/2017 |
| JP | 2017-537399 A | 12/2017 |
| WO | 2017/014194 A1 | 1/2017 |

OTHER PUBLICATIONS

US Office Action for U.S. Appl. No. 18/380,884, mailed on Dec. 19, 2024.
US Office Action for U.S. Appl. No. 18/380,879, mailed on Dec. 19, 2024.
US corrected Office Action for U.S. Appl. No. 18/380,879, mailed on Dec. 19, 2024.
Office Action issued from Japanese Patent Application No. 2018-066026 issued on Dec. 24, 2019.
International Search Report for PCT/JP2019/013547 dated Apr. 23, 2019 (PCT/ISA/210).
Chinese Office Action for CN Application No. 201980021375.7 mailed on Jan. 3, 2023 with English Translation.
US Office Action for U.S. Appl. No. 16/971,715, mailed on Mar. 6, 2024.

\* cited by examiner

| LEARNING MODEL | ASSUMED USAGE |
|---|---|
| LEARNING MODEL A | FOREIGN MAIL CUSTOMS POST OFFICE A |
| LEARNING MODEL B | FOREIGN MAIL CUSTOMS POST OFFICE B |
| LEARNING MODEL SP | PRIORITIZED INSPECTION ARTICLE |
| ⋮ | ⋮ |

| LEARNING MODEL | ASSUMED USAGE |
|---|---|
| LEARNING MODEL A1 | FOREIGN MAIL CUSTOMS POST OFFICE A, XMAS SEASON |
| LEARNING MODEL A2 | FOREIGN MAIL CUSTOMS POST OFFICE A, OUTSIDE OF XMAS SEASON |
| LEARNING MODEL B1 | FOREIGN MAIL CUSTOMS POST OFFICE B JANUARY-MARCH |
| LEARNING MODEL B2 | FOREIGN MAIL CUSTOMS POST OFFICE B APRIL-DECEMBER |
| LEARNING MODEL C | FOREIGN MAIL CUSTOMS POST OFFICE C |
| : | : |

| LEARNING MODEL | ASSUMED USAGE |
|---|---|
| LEARNING MODEL AA | FOREIGN MAIL CUSTOMS POST OFFICE A - SENDER LOCATION: COUNTRY A |
| LEARNING MODEL AB | FOREIGN MAIL CUSTOMS POST OFFICE A - SENDER LOCATION: COUNTRY B |
| LEARNING MODEL AX | FOREIGN MAIL CUSTOMS POST OFFICE A - SENDER LOCATION: ELSEWHERE |
| LEARNING MODEL B | FOREIGN MAIL CUSTOMS POST OFFICE B |
| LEARNING MODEL C | FOREIGN MAIL CUSTOMS POST OFFICE C |
| : | : |

SORTING SUPPORT APPARATUS, SORTING SUPPORT SYSTEM, SORTING SUPPORT METHOD, AND PROGRAM

CROSS-REFERENCE TO RELATED APPLICATIONS

This application is a Continuation of U.S. application Ser. No. 16/971,715 filed on Aug. 21, 2020, which is a National Stage of International Application No. PCT/JP2019/013547 filed on Mar. 28, 2019, claiming priority based on Japanese Patent Application No. 2018-066026 (filed on Mar. 29, 2018) the content of which is hereby incorporated in its entirety by reference into this specification. The present disclosure relates to a sorting support apparatus, a sorting support system, a sorting support method, and a program.

FIELD

Background

Among articles imported into Japan from abroad are various types of prohibited articles and restricted articles. Prohibited articles include, for example, firearms, explosives, narcotics and specified drugs. Inspection of these is carried out at customs at various locations and post offices that have a customs facility for foreign mail (referred to below as "foreign mail customs post office").

Similar restrictions also apply to general goods within Japan. Additionally, there are articles such as lithium batteries, explosives and the like which are prohibited from being transported by air, as hazardous materials for air transportation. These inspections are carried out at customs offices or distributor locations.

X-ray scanning apparatuses are used in these inspections. For example, Patent Literature (PTL) 1 discloses a system, a method, a device and an apparatus for determining whether an individual (22) is carrying a suspicious concealed object (25) in their clothing. The same literature discloses detecting a suspicious concealed object (25) through inspection by electromagnetic radiation in a range of 200 MHz-1 THz, by a process of receiving image data corresponding to the intensity of reflected radiation and depth difference of a reflecting surface.

PTL 1

Japanese Patent Kohyo Publication No. 2007-517275A

SUMMARY

At customs, besides X-ray scanning, inspections are carried out at the same time with drug-sniffing dogs, and from the viewpoint of whether the weight and size of declared contents are in conformity. However, in recent years prohibited articles and restricted articles are cleverly carried, and in such cases, it is necessary to rely on inspections by staff, so that staff work load is increasing.

It is an object of the present disclosure to provide a sorting support apparatus, a sorting support system, a sorting support method, and a program, that can contribute to reducing the load of inspection work in the abovementioned logistics process.

According to a first aspect, the disclosure provides a sorting support apparatus comprising: an input part that inputs a transmission image obtained by radiating an inspection target with electromagnetic waves; a storage part that stores a plurality of learning models optimized respectively for at least one article and being associated with an assumed usage condition; and a determination part that selects one of the learning models based on a specified usage condition and uses the learning model to determine whether or not the one or more articles is contained in the inspection target.

According to a second aspect, the disclosure provides a sorting support system wherein the sorting support apparatus is disposed at multiple stages to determine in a stepwise manner whether or not the at least one article is included, using different learning models.

According to a third aspect, the disclosure provides a sorting support method, wherein a sorting support apparatus comprising an input part that inputs a transmission image obtained by radiating an inspection target with electromagnetic waves, and a storage part that stores a plurality of learning models optimized respectively for at least one article and being associated with an assumed usage condition, selects one of the learning models based on a specified usage condition, and determines, by using the learning model, whether or not the one or more articles is included in the inspection target. The method is associated with a particular machine that is a sorting support apparatus which is provided with an input part, a storage part and a processor that implements various processing steps.

According to a fourth aspect, the disclosure provides a program that causes a computer, installed in a sorting support apparatus comprising an input part that inputs a transmission image obtained by radiating an inspection target with electromagnetic waves, and a storage part that stores a plurality of learning models optimized respectively for at least one article and being associated with an assumed usage condition, to execute processing comprising selecting one of the learning models based on a specified usage condition, and determining, by using the learning model, whether or not the one or more articles is included in the inspection target. It is to be noted that this program may be recorded on a computer-readable (non-transitory) storage medium. That is, the present disclosure may be embodied as a computer program product. The program may be inputted via an input apparatus or communication interface from outside to a computer apparatus, stored in the storage apparatus, and activated according to prescribed steps or processes of a processor. The program may display a processing result thereof including an intermediate state as necessary via a display apparatus for each stage, or may communicate with the outside via a communication interface. A computer apparatus for this is typically provided with, as an example, a processor that can be interconnected therewith by a bus, a storage apparatus, an input apparatus, a communication interface, and a display apparatus as necessary.

DISCLOSURE

The meritorious effects of the present disclosure are summarized as follows.

The disclosure can contribute to reducing the load required in inspection work in the abovementioned logistics process. That is, the present disclosure transforms a sorting support apparatus described in the background technology into one that may dramatically reduce staff work load.

PREFERRED MODES

First, a description is given of an outline of an example embodiment of the present disclosure, making reference to the drawings. It is to be noted that reference symbols in the drawings attached to this outline are added to respective elements for convenience as examples in order to aid understanding, and are not intended to limit the present disclosure to modes illustrated in the drawings. Connection lines between blocks in the diagrams referred to in the following description include both unidirectional and bidirectional. Unidirectional arrows schematically show flow of main signals (data), but do not exclude bidirectionality. There are ports and interfaces at input output connection points of respective blocks in the diagrams, but illustrations thereof are omitted. A program is executed via a computer apparatus, and the computer apparatus is provided with, for example, a processor, a storage apparatus, an input apparatus, a communication interface, and a display apparatus as necessary. The computer apparatus is configured to enable communication, either wireless or wired, with equipment (including a computer) within or outside the apparatus via a communication interface.

Figure 1:
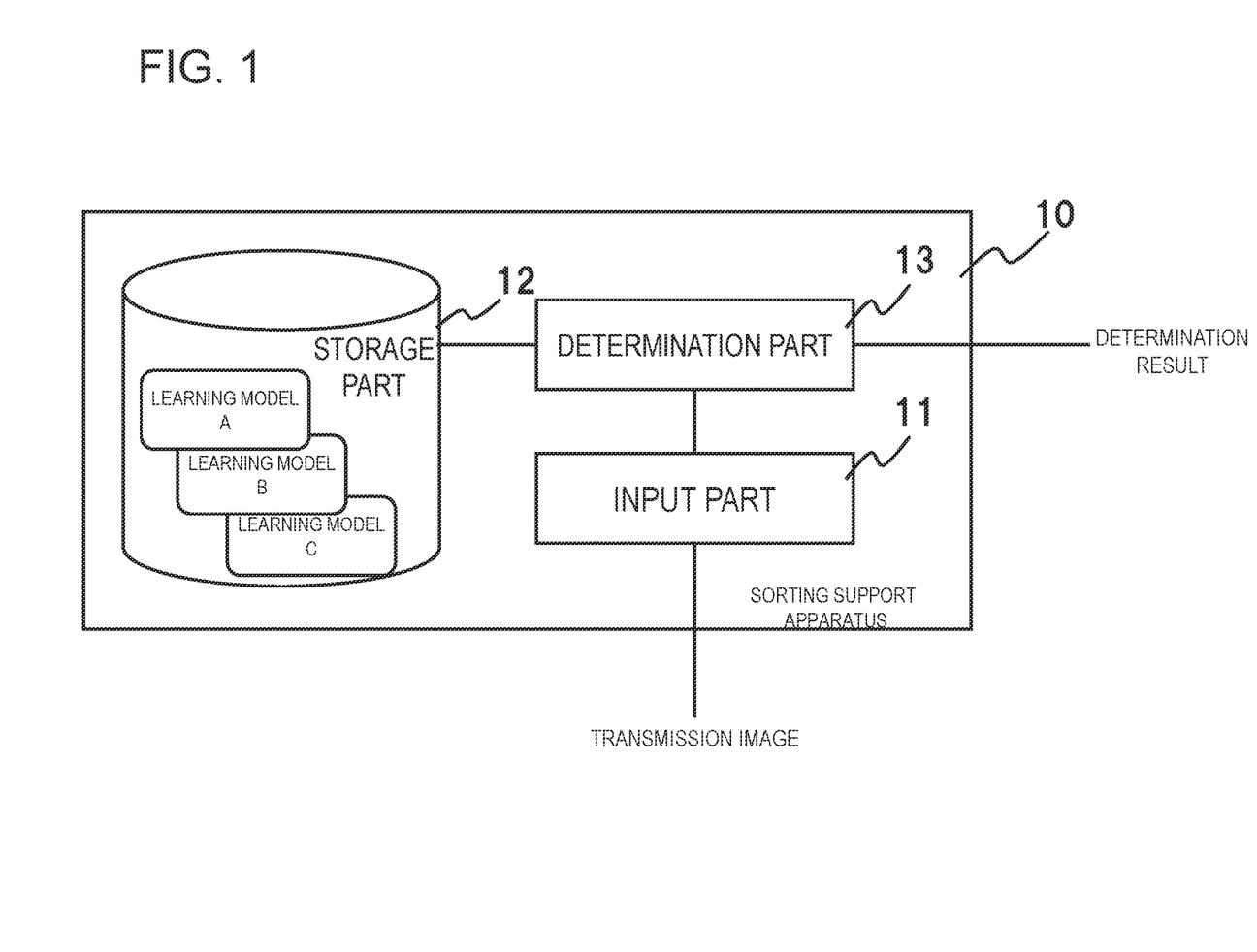
FIG. 1 is a diagram illustrating a configuration of an example embodiment of the present disclosure.

The present disclosure, in an example embodiment thereof as shown in FIG. 1, may be implemented as a sorting support apparatus 10 provided with an input part 11, a storage part 12 and a determination part 13. More specifically, the input part 11 inputs a transmission image from an apparatus that obtains the transmission image by radiating an inspection target with electromagnetic waves.

The storage part 12 stores a plurality of learning models A to C, associated with assumed usage conditions and optimized respectively for at least 1 article. The learning models A to C may be created using AI (Artificial Intelligence) as represented by deep learning, using transmission images of the respective articles as instructor data.

The determination part 13 selects one of the learning models, based on a specified usage condition, uses the learning model to determine whether or not the at least one article is included in the inspection target, and outputs a result thereof.

The sorting support apparatus of the present disclosure is installed at various sites where inspection of contents of goods is needed. Articles for which detection is anticipated by the present apparatus are different at each of these sites. Therefore, by creating the abovementioned learning models A to C, using these articles for which detection is anticipated as learning data with instructor, it is possible to perform sorting support specialized for each site.

For example, for a certain logistics operator, in a case where there is concern about a small sized electrical appliance received with a built-in lithium battery, a learning model is prepared that is optimized to enable a lithium battery or small sized electrical appliance to be suitably detected. At an air transport goods inspection site of the logistics operator, the sorting support apparatus makes a determination regarding the inspection target by using this learning model corresponding to the usage condition (lithium battery detection).

For example, in the same way for a certain logistics operator, in a case where there is concern about goods being receiving that contain a living creature such as an insect or a small animal, a learning model is prepared that is optimized to enable these living creatures to be suitably detected. At a goods inspection site of the logistics operator, the sorting support apparatus makes a determination regarding the inspection target by using this learning model corresponding to the usage condition (living creature detection).

It is to be noted that in selection of the learning model, a user of the sorting support apparatus 10 may explicitly specify a usage condition, or the sorting support apparatus 10 may determine a usage condition based on information inputted by the user of the sorting support apparatus 10, to select the learning model.

As described above, according to the present disclosure, it is possible to improve the accuracy of sorting by the sorting support apparatus 10, and to reduce misjudgments. A reason for this is due to the employment of a configuration in which selection is performed of a learning model used in the sorting support apparatus 10 based on a specified usage condition.

First Exemplary Embodiment

Figure 2:
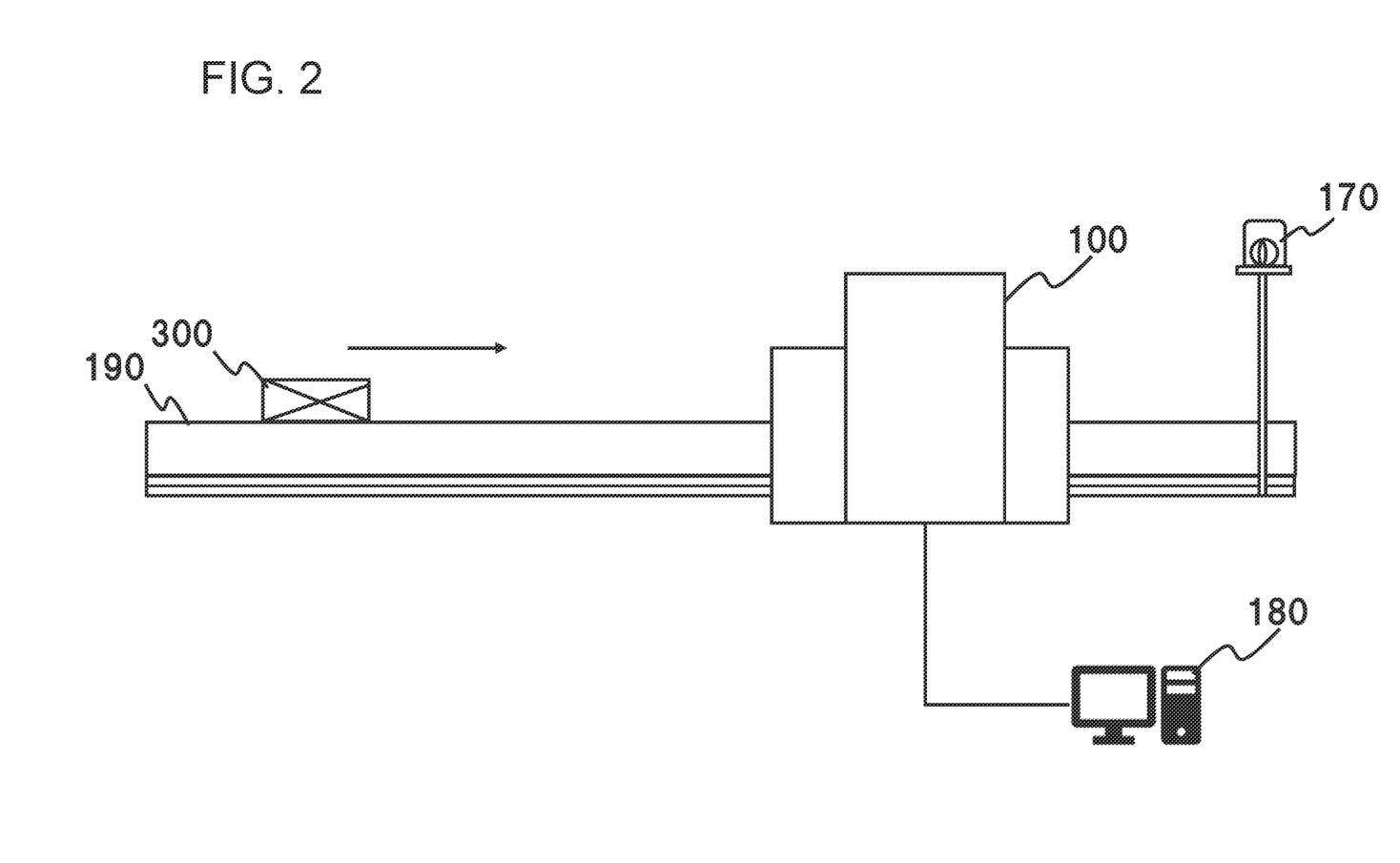
FIG. 2 is a diagram showing an overall configuration of a system including a sorting support apparatus in a first example embodiment of the disclosure.

Continuing, a detailed description referring to the drawings is given concerning a first example embodiment of the present disclosure assuming supporting an inspection operation on a post office article at a foreign mail customs post office, using an X-ray as an electromagnetic wave for obtaining a transmission image. FIG. 2 is a diagram showing an overall configuration of a system including a sorting support apparatus of the first example embodiment of the disclosure. FIG. 2 shows the sorting support apparatus 100 in a form straddling a belt conveyor 190 that moves a package 300. In the example of FIG. 2 the sorting support apparatus 100 is connected to a rotating light 170 and to an operation terminal 180.

In a case of determining that a specific article is included in the package 300 that is an inspection target, the sorting support apparatus 100 activates the flashing light 170 and also performs an operation to stop the belt conveyor 190. Clearly, it is also possible to employ a mode where, instead of the flashing light 170, a speaker is connected and a buzzer or a voice announcement is outputted. Instead of these it is possible to employ a mode in which a warning is displayed on a console or dashboard (information display program) or the like on a display screen of an operation terminal. An inspection staff member accepts these outputs, confirms whether or not the weight of the package 300 matches the contents, and performs a detailed inspection by opening it. In order to reduce the workload of the inspection staff member in these processes, an apparatus which automatically sorts a package determined to include a specific article may be disposed there beside.

The operation terminal 180 is an apparatus such as a personal computer (PC) used for setting a learning model, described later, in the sorting support apparatus 100, or for setting a usage condition of the sorting support apparatus 100. Using the operation terminal 180, the sorting support apparatus 100 may be enabled to set an operation in a case of a determination that a specific article is included in the package.

Figure 3:
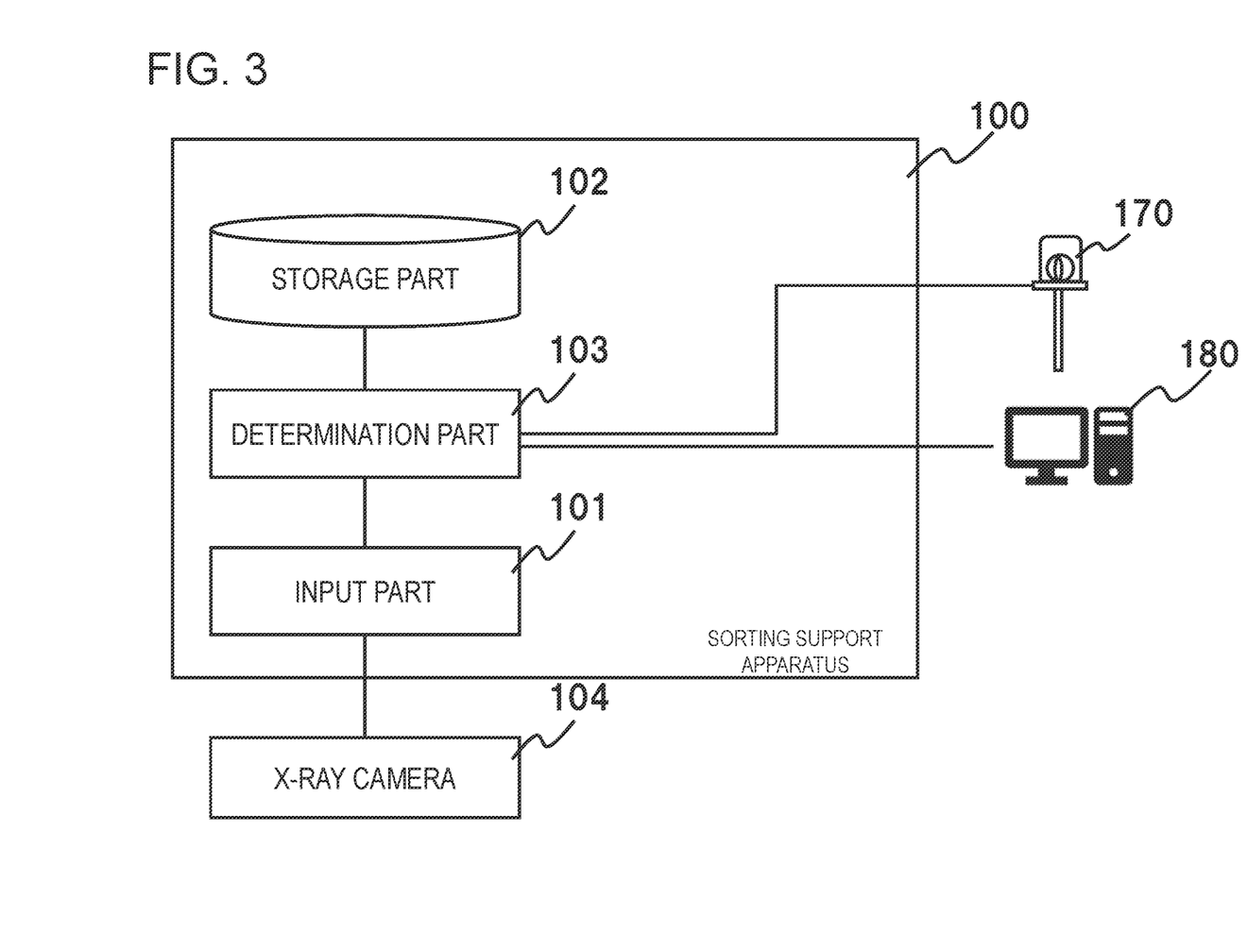
FIG. 3 is a functional block diagram showing a configuration of the sorting support apparatus in the first example embodiment of the disclosure.

FIG. 3 is a functional block diagram showing a configuration of the sorting support apparatus in the first example embodiment of the disclosure. FIG. 3 shows the sorting support apparatus 100 provided with an input part 101, a storage part 102 and a determination part 103.

When an X-ray image is inputted from an X-ray camera 104 disposed inside an internal casing of a sorting support apparatus, the input part 101 outputs to the determination part 103. At this time, the input part 101 may perform essential pre-processing in order to improve determination accuracy of the determination part 103.

The storage part 102 stores a plurality of learning models that are associated with assumed usage conditions and optimized respectively for at least 1 article. The learning models may be created using AI as represented by deep learning, using a large amount of actually obtained X-ray images as instructor data.

Figure 4:
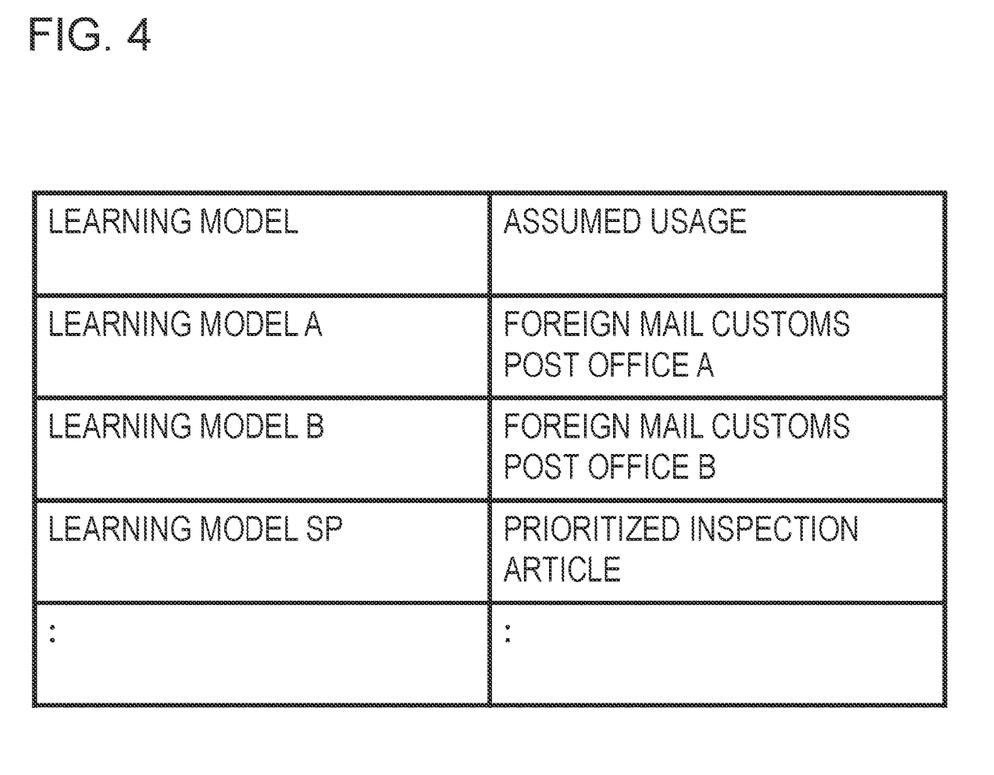
FIG. 4 is a diagram showing an example of a set of learning models held by the sorting support apparatus in the first example embodiment of the disclosure.

FIG. 4 is an example of a set of learning models according to location (sorting site) stored in the storage part 102. A learning model A in FIG. 4 is a learning model created assuming usage at a foreign mail customs post office (this type of foreign mail customs post office is described below as "foreign mail customs post office A") handling a large amount of surface mail. Specifically, the learning model A is created using image data of various types of prohibited articles and restricted articles actually found at a foreign mail customs post office A, to calculate a characteristic amount thereof. Similarly, a learning model B is a learning model created assuming usage at a foreign mail customs post office (described below as "foreign mail customs post office B") handling a large amount of air mail or EMS (Express Mail Service). Specifically, the learning model B is created using image data of various types of prohibited articles and restricted articles actually found at a foreign mail customs post office B, to calculate a characteristic amount thereof. There is a great variety of packages (post office articles) that arrive at foreign mail customs post offices, but by systematic elimination of such learning models, it is possible to improve detection accuracy of specific articles and to reduce misjudgment rates, without improving the required performance of the sorting support apparatus. It is to be noted that clearly a learning model outside of the learning models A and B may be provided, according to differences of articles handled at each foreign mail customs post office.

It is to be noted that the learning model SP of FIG. 4 is a learning model that assumes prioritized inspection articles. For example, at each customs point, a time-period is established and strengthening of inspection of specific articles is carried out. The learning model SP is a learning model created in order to strengthen the inspection of articles set as prioritized inspection articles. By using this type of learning model SP alone, or using learning models A and B together, it is possible to handle strengthening of inspection of prioritized inspection articles. It is to be noted that the set of learning models shown in FIG. 4 is merely an example thereof, and the set of learning models may be changed according to location (sorting location).

The determination part 103 selects a learning model based on a usage condition of the sorting support apparatus 100 inputted by the operation terminal 180 and performs inspection of a package. For example, the determination part 103 uses the learning model to inspect an X-ray image and calculate the probability (likelihood) that a specified article is included in the inspection target. In a case where the probability (likelihood) is greater than or equal to a prescribed threshold, the determination part 103 determines that the article is included in the inspection target, and activates the rotating light 170 along with performing an operation to stop the belt conveyor 190.

Figure 5:
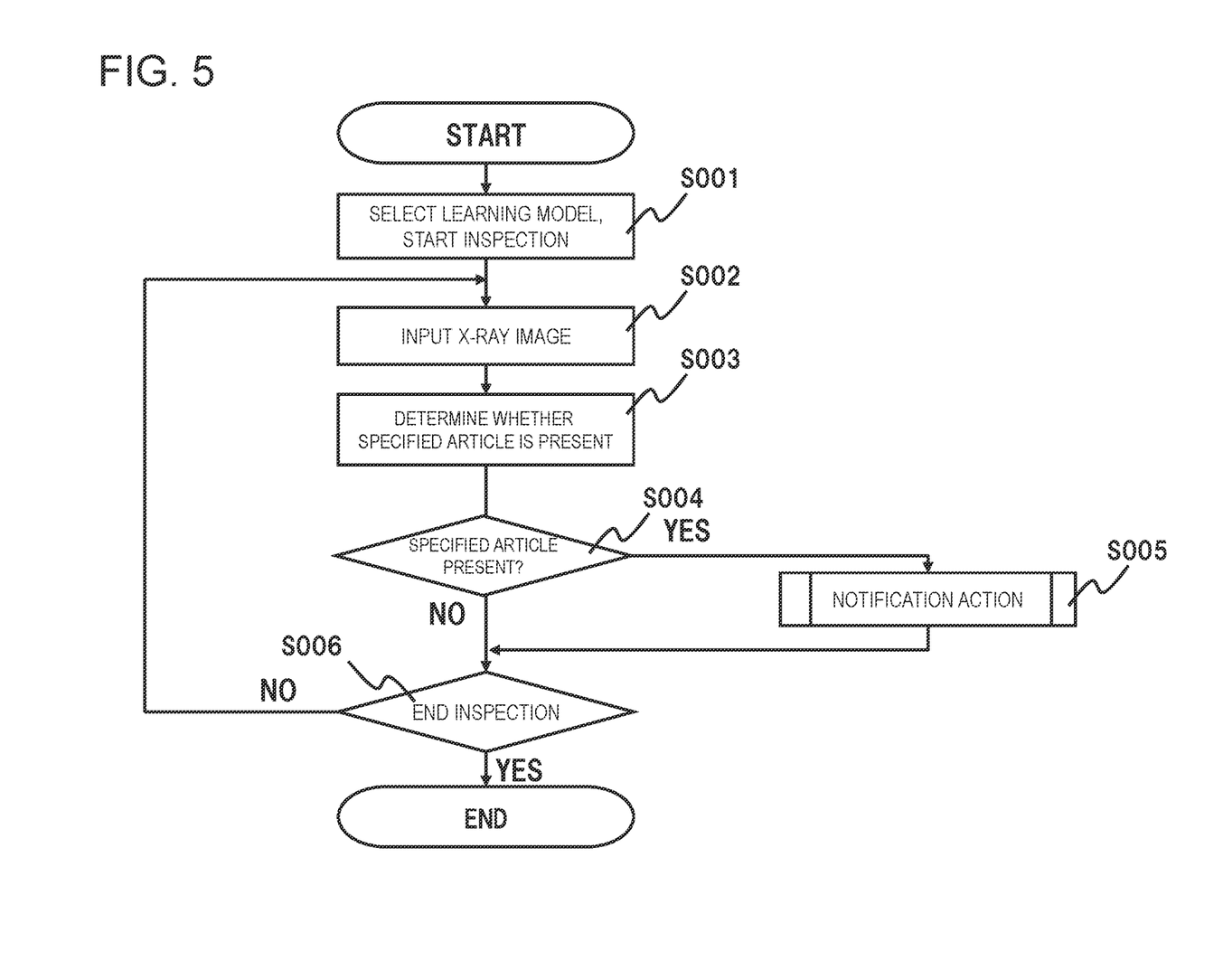
FIG. 5 is a flowchart representing operations of the sorting support apparatus in the first example embodiment of the disclosure.

Continuing, a detailed description referring to the drawings is given concerning operations of the present example embodiment. FIG. 5 is a flow chart representing operations of the sorting support apparatus in the first example embodiment of the disclosure. Referring to FIG. 5, first, a learning model is selected at the operation terminal 180 and an inspection is started (step S001). In this way, the belt conveyor 190 is activated and an image taken by the X-ray camera 104 is sent to the sorting support apparatus 100.

When the X-ray image is inputted (step S002), the sorting support apparatus 100 uses the selected learning model to confirm whether or not a specified article is included in the X-ray image (step S003). Here, in a case where it is determined that a specified article is included in the X-ray image (YES in step S004), the sorting support apparatus 100 activates the rotating light 170, along with performing an operation to stop the belt conveyor 190 (step S005).

An inspection staff member who receives the notification performs a detailed check of a package 300 for which a determination has been made that a specified article is included in the X-ray image, and performs an inspection to open the package as necessary.

Meanwhile, in a case where it is determined that a specified article is not included in the X-ray image (step S004), the sorting support apparatus 100 continues with input of an X-ray image and making a determination until the inspection is finished (continuation steps S002 to S006).

It is to be noted that to finish the inspection, a determination may be made, for example, by input of an end-operation by the operation terminal 180 or a prescribed time being reached.

As described above, according to the present example embodiment it is possible to dramatically improve the determination accuracy of the sorting support apparatus. A reason for this is that a configuration is employed in which a plurality of learning models are provided and a selection to be used is made in accordance with a usage condition. Another aspect of the improvement in determination accuracy according to the present example embodiment is that misjudgments can be reduced.

Second Exemplary Embodiment

Continuing, a detailed description referring to the drawings is given concerning a second example embodiment in which a modification is added to the set of learning models stored in the storage part 102. Since the second example embodiment can be implemented by a configuration similar to the first example embodiment, a description is given below centered on points of difference.

Figure 6:
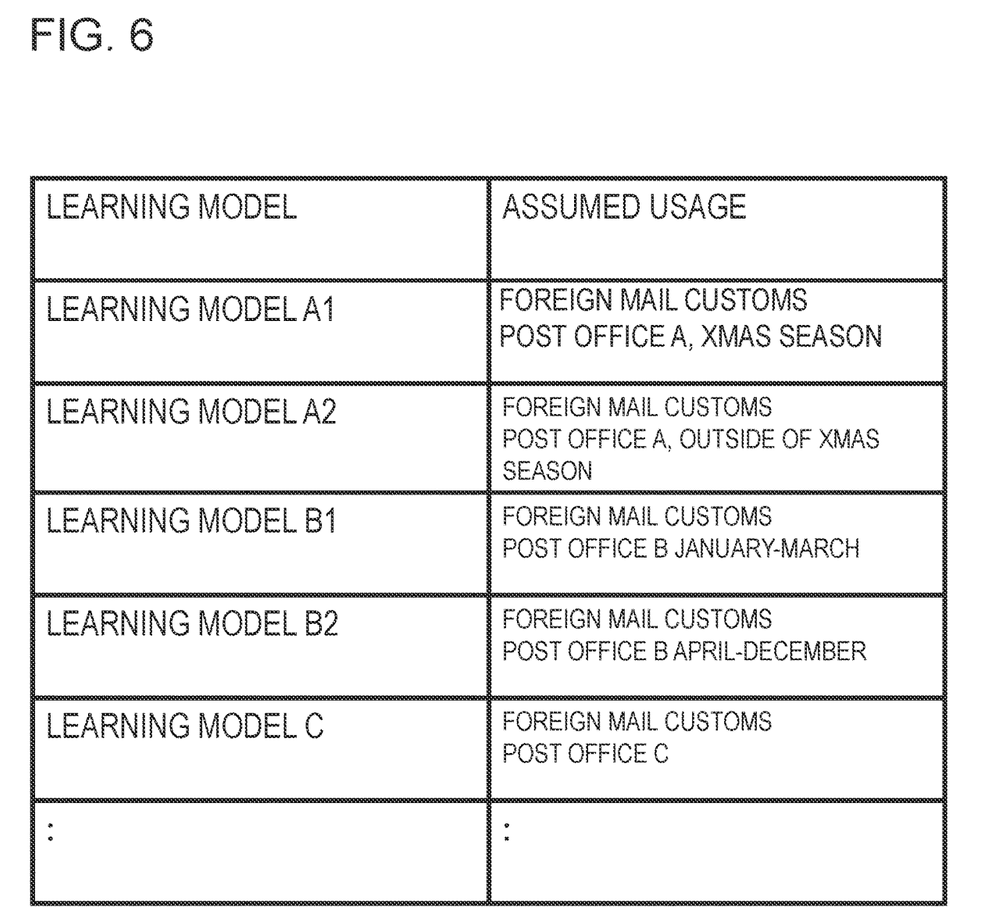
FIG. 6 is a diagram showing an example of a set of learning models held by the sorting support apparatus in a second example embodiment of the disclosure.

FIG. 6 is an example of a set of learning models stored in the storage part 102 of the sorting support apparatus 100 of the second example embodiment. A point of difference from the set of learning models shown in FIG. 4 is that, for the same foreign mail customs post office, a plurality of learning models are provided, giving consideration to the season and time-period.

A learning model A1 in FIG. 6 is a learning model created assuming usage in the Christmas season at a foreign mail customs post office A that handles a large amount of surface mail. Specifically, the learning model A1 is created using image data of prohibited articles and restricted articles prepared giving consideration to trends among articles actually handled in the Christmas season, at the foreign mail customs post office A. Similarly, a learning model A2 is created using image data of prohibited articles and restricted articles prepared giving consideration to trends among goods actually handled outside the Christmas season, at the foreign mail customs post office A. In this way, by using learning models according to the Christmas season and to other seasons, it is possible to perform sorting giving consideration to a rapid increase in greeting cards or presents in the Christmas season. In other seasons, by using a learning model that does not give consideration to the presence of greeting cards and presents, it is possible to improve sorting accuracy.

A learning model B1 in FIG. 6 is a learning model created assuming usage in January to March at a foreign mail customs post office B. Similarly, a learning model B2 is a learning model created assuming usage in April to December at a foreign mail customs post office B. For example, in the Asian region, since there is a change in articles handled at the Chinese new year, using this type of learning model is effective.

As described above, according to the present example embodiment it is possible to perform sorting support giving consideration to change in packages according to season and time-period. It is to be noted that in the abovementioned description, learning models are used according to season and time-period at foreign mail customs post office units, as in foreign mail customs post offices A and B, but it is also possible to employ a configuration that does not consider differences of foreign mail customs post offices, but provides learning models according to the season and according to the time-period, to jointly use learning models at a plurality of foreign mail customs post offices.

Third Exemplary Embodiment

Continuing, a detailed description referring to the drawings is given concerning a third example embodiment in which learning models are used giving consideration to sender location (remitter location). Since the third example embodiment can basically be implemented by a configuration similar to the first example embodiment, a description is given below centering on points of difference.

Figure 7:
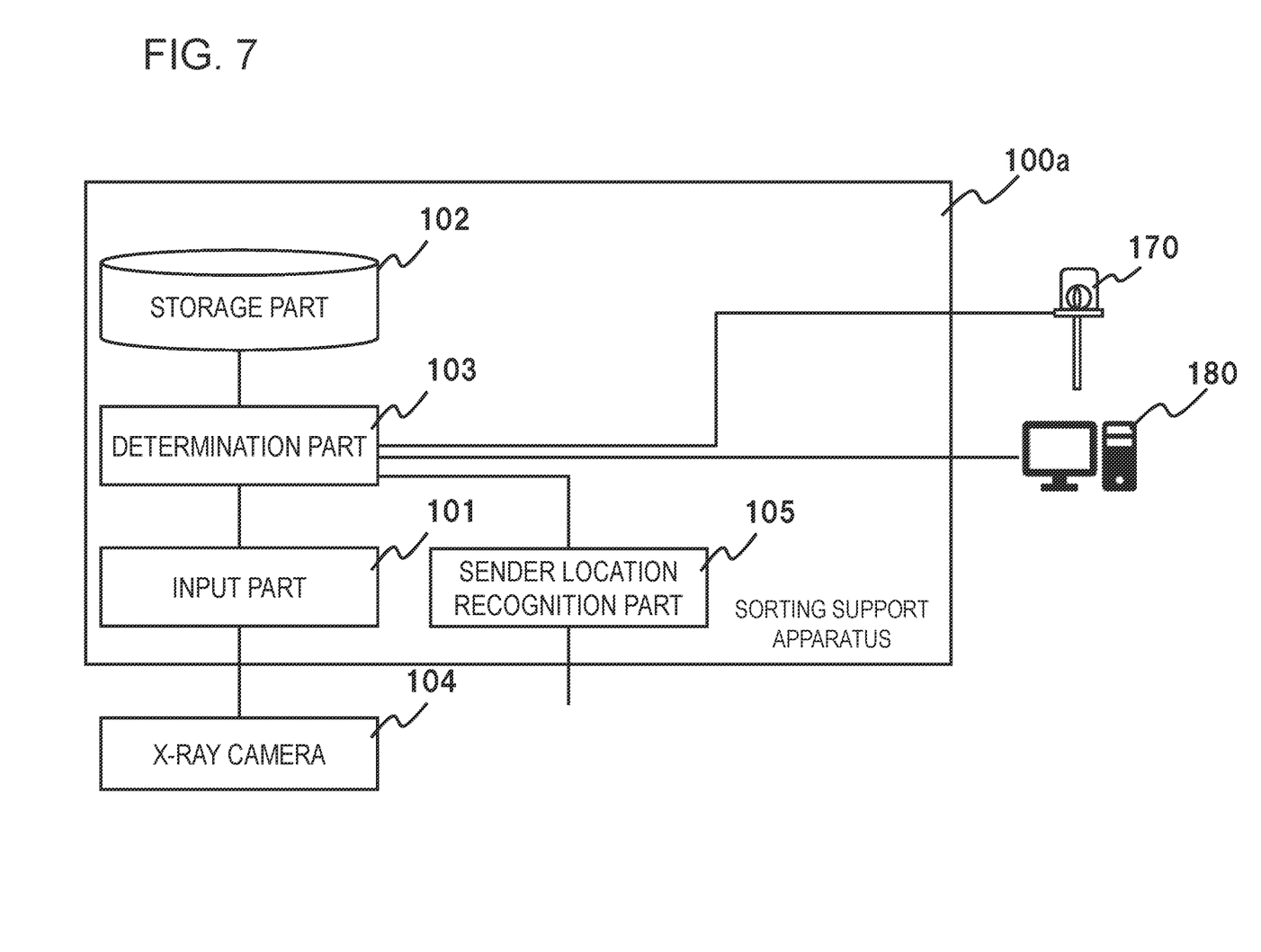
FIG. 7 is a functional block diagram showing a configuration of the sorting support apparatus in a third example embodiment of the disclosure.

FIG. 7 is a functional block diagram showing a configuration of a sorting support apparatus 100a in the third example embodiment of the disclosure. A point of difference from the sorting support apparatus 100 of the first example embodiment shown in FIG. 3 is that a sender location recognition part 105 is added, and a determination part 103 selects a learning model using a sender location recognized by the sender location recognition part 105.

The sender location recognition part 105 recognizes the sender location from a tag, an addressee label, an airline sticker, a barcode or the like, attached to a package 300. It is to be noted that character recognition technology may be used as a method of recognizing the sender location. Besides the method of recognizing sender location directly from the tag or the like, it is also possible to adopt a configuration in which the package 300 is identified from tracking information or query number of the package 300, and to send a query about the sender location to an external server or the like.

Figure 8:
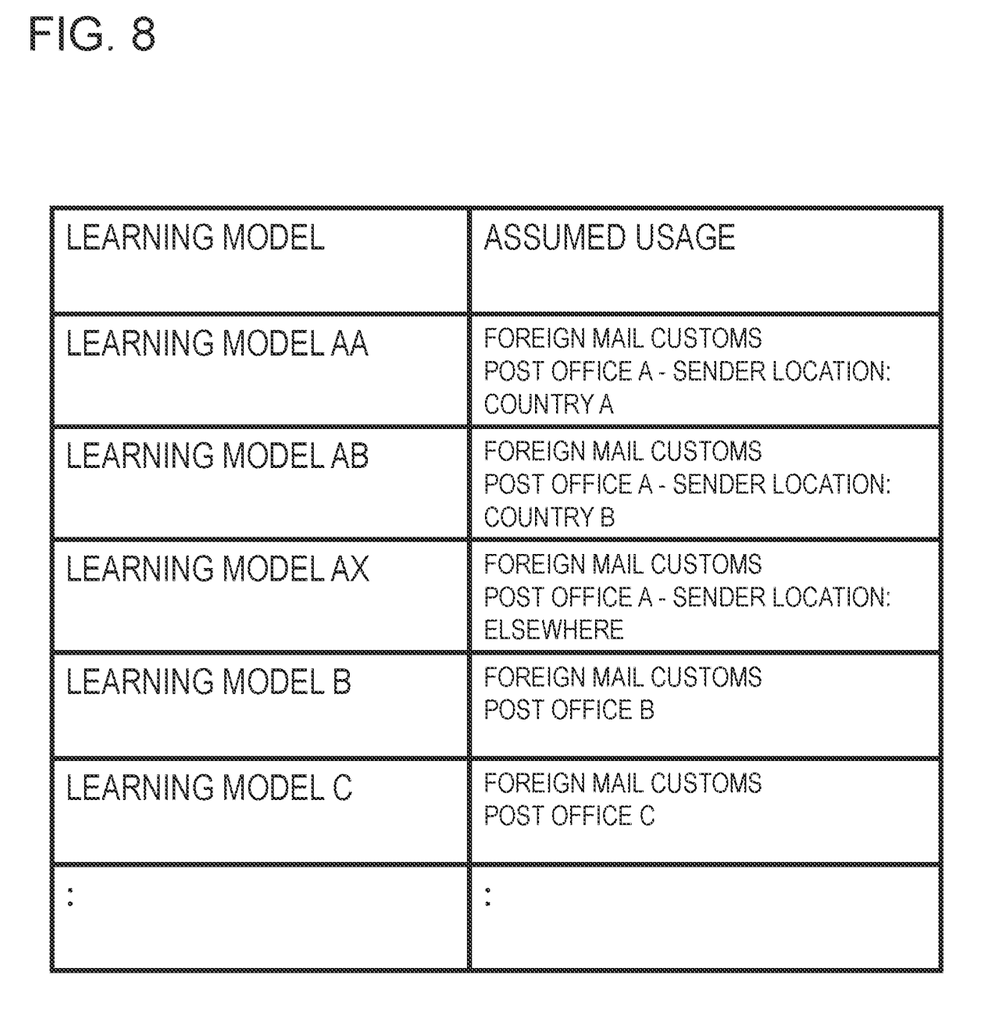
FIG. 8 is a diagram showing an example of a set of learning models held by the sorting support apparatus in the third example embodiment of the disclosure.

FIG. 8 is an example of a set of learning models stored in the storage part 102 of the sorting support apparatus 100a of the third example embodiment. A point of difference from the set of learning models shown in FIG. 4 is that, for the same foreign mail customs post office, a plurality of learning models are provided according to sender location.

A learning model AA in FIG. 8 is a learning model created assuming as a target a package with country A as a sender location, at foreign mail customs post office A that handles a large amount of surface mail. Specifically, the learning model AA is created using image data of prohibited articles and restricted articles actually found in a package sent from country A at a foreign mail customs post office. Similarly, a learning model AB is created using image data of prohibited articles and restricted articles actually found in a package sent from country B at the foreign mail customs post office A. Similarly, a learning model AX is created using image data of prohibited articles and restricted articles actually found in a package sent from somewhere other than country A and country B, at the foreign mail customs post office A. In this way, by using learning models according to sender location, it is possible to perform sorting giving consideration to trends in packages sent from respective countries.

The determination part 103 in the present example embodiment selects a learning model based on sender location information obtained at the sender location recognition part 105, in addition to a usage condition of the sorting support apparatus 100a inputted by the operation terminal 180, and performs an inspection of the package.

Figure 9:
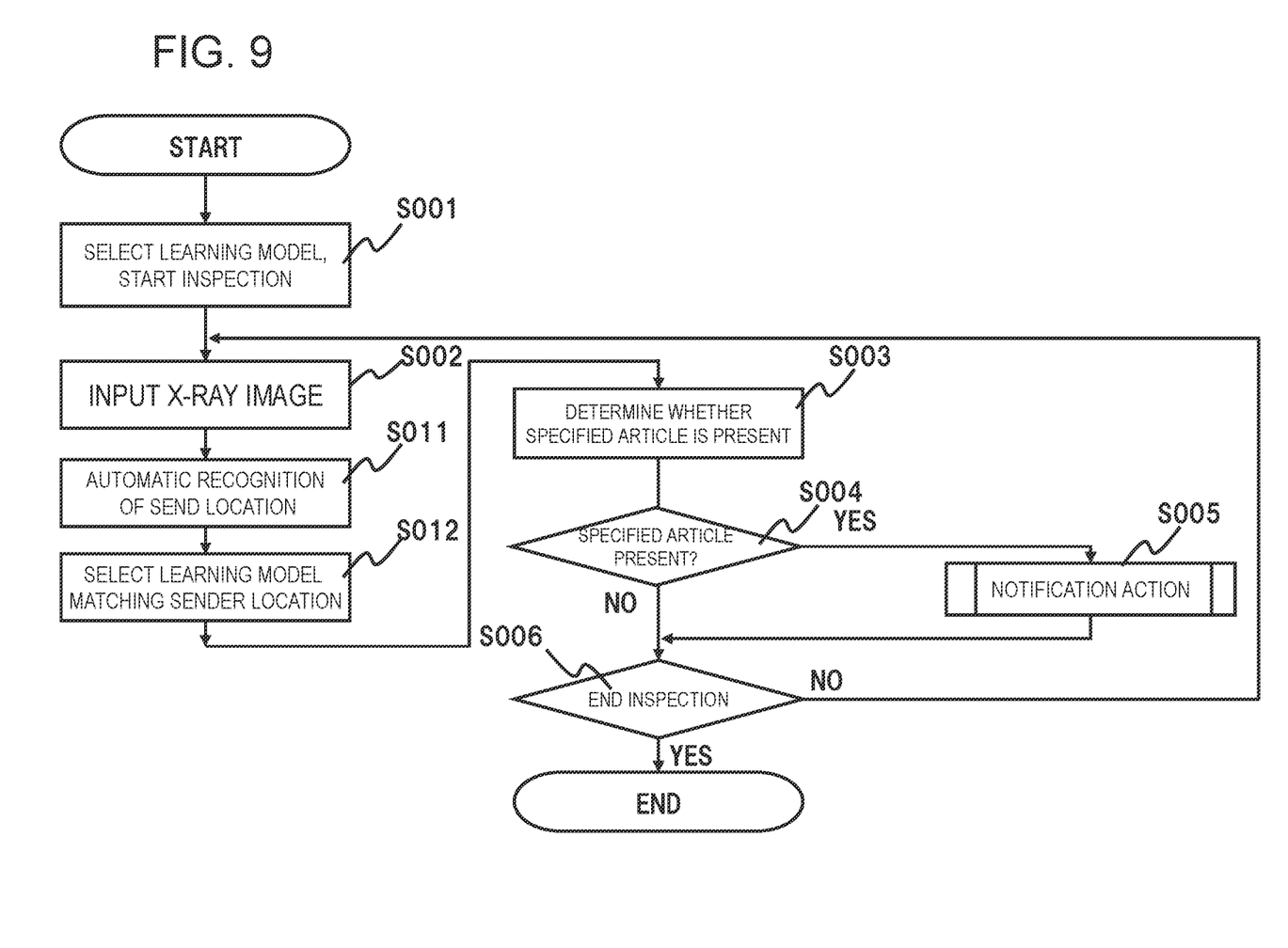
FIG. 9 is a flowchart representing operations of the sorting support apparatus in the third example embodiment of the disclosure.

FIG. 9 is a flow chart representing operations of the sorting support apparatus 100a in the present example embodiment. Steps S011 and S012 are added to FIG. 5 that shows operations of the first example embodiment. That is, the sorting support apparatus 100a performs automatic recognition of sender location, after input of an X-ray image (step S011). It is to be noted that in the example of FIG. 9, automatic recognition of sender location is performed after input of an X-ray image, but the automatic recognition of the sender location may also be performed first.

The sorting support apparatus 100a performs reselection of a learning model giving consideration to the recognized sender location (step S012). Since subsequent operations are similar to the first example embodiment, a description is omitted.

As described above, according to the present example embodiment, it is possible to perform sorting support giving consideration to change in packages according to difference of sender location. It is to be noted that in the abovementioned description, learning models are used according to sender location in foreign mail customs post office units, as in foreign mail customs post offices A and B, but it is also possible to employ a configuration that does not consider differences of foreign mail customs post offices, but provides learning models according to sender location, to jointly use learning models at a plurality of foreign mail customs post offices.

Fourth Exemplary Embodiment

Figure 10:
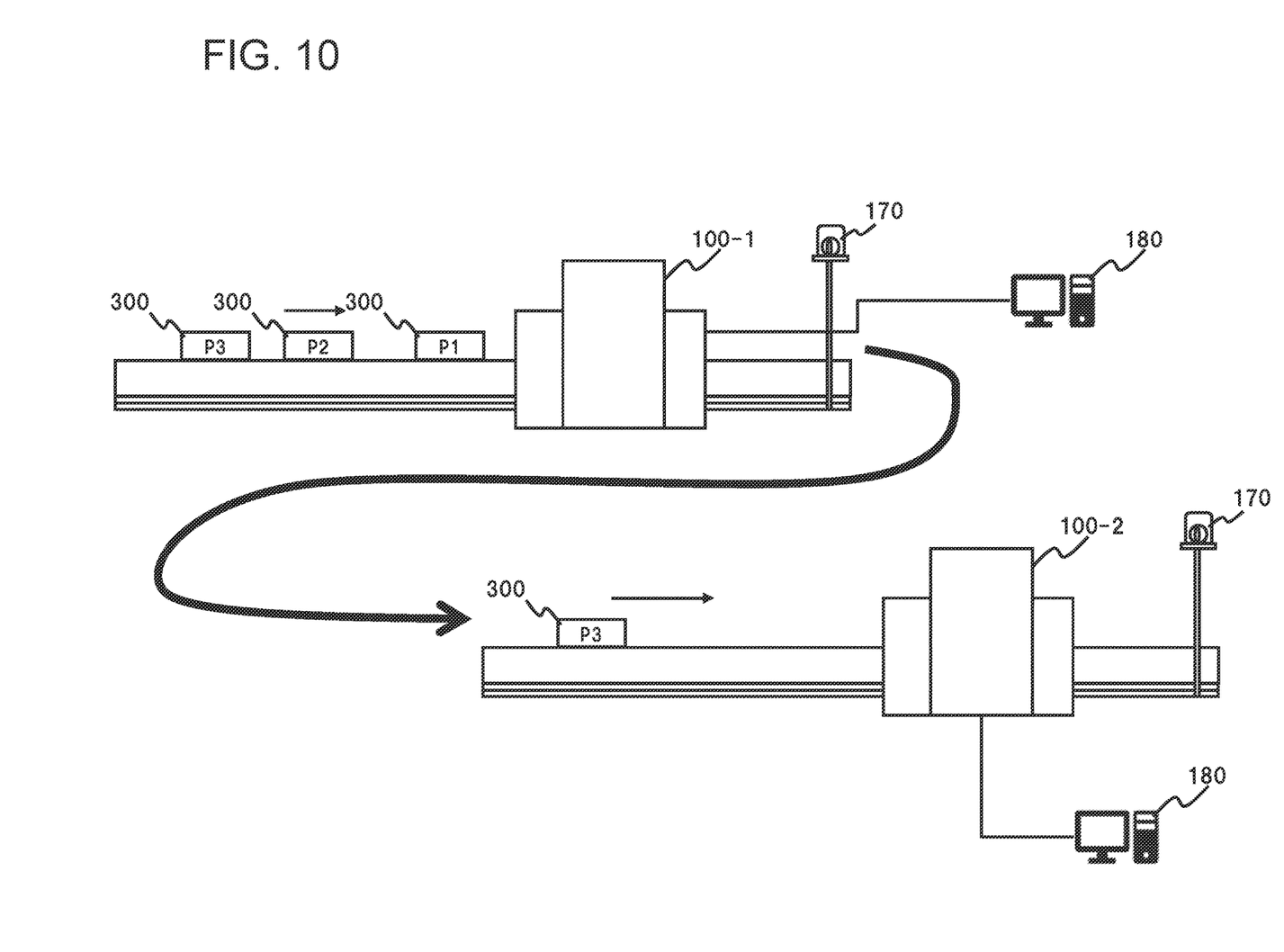
FIG. 10 is a diagram showing an overall configuration of a system including the sorting support apparatus in a fourth example embodiment of the disclosure.

Continuing, a description is given of a fourth example embodiment combining the sorting support apparatuses of the first to third example embodiments described above, to perform sorting of packages in a stepwise manner. FIG. 10 is a diagram showing an overall configuration of a system including a sorting support apparatus in the fourth example embodiment of the disclosure. For example, in a sorting support apparatus 100-1 at a first stage, inspection of a package is performed using a learning model B directed toward foreign mail customs post office B. In a sorting support apparatus 100-2 at a second stage, inspection of a package is performed using a learning model SP specialized for inspection of prioritized inspection articles.

For example, as shown in FIG. 10, the sorting support apparatus 100-1 uses the learning model B to inspect miscellaneous packages (P1 to P3), and sorts a package (P3 in FIG. 10) that may contain an article outside of paper. The sorting support apparatus 100-2 uses a learning model SP, inspects only a package (P3 in FIG. 10) that may contain an article outside of paper, and performs a determination from a viewpoint as to whether or not it contains a prioritized inspection article.

According to the fourth example embodiment with the above type of multi-stage configuration, it is possible to focus on the number of packages sent to the sorting support apparatus that performs a more difficult inspection and determination, and to send the package to a sorting support apparatus that uses a learning model that performs a more sensitive inspection. This sensitive inspection can realize changing of determination threshold even where the same learning model is used. For example, in a calculation using a learning model, in a case of a probability of 60% or more of a determination that a suspect article is contained, instead of a normal-time operation determining that there is a specific article, the threshold may be changed so as make a determination that there is a specific article in a case where this probability is 50% or more.

In the example of FIG. 10, a 2 stage configuration with a sorting support apparatus 100-1 and a sorting support apparatus 100-2 is assumed, but a multi-stage inspection with 3 or more stages may also be performed, using 3 or more sorting support apparatuses.

From a different viewpoint, it is also possible to employ a configuration in which a high risk article is detected first. For example, sorting support apparatuses that perform inspection using a learning model optimized for detection of "powder" and "pills" that have a high probability of being drugs, may be disposed in a first stage of multiple stages. From a similar viewpoint, sorting support apparatuses that perform inspection using a learning model optimized for detection of articles such as a "knife" or a "brand name article" for which visual inspection is required, may be disposed in any stage of multiple stages. In addition, low risk articles outside of paper may be added to excluded targets in the sorting support apparatus at a first stage.

A description has been given above of respective example embodiments of the present disclosure, but the present disclosure is not limited to the abovementioned example embodiments, and modifications, substitutions and adjustments may be added within a scope that does not depart from fundamental technical concepts of the disclosure. For example, network configurations, respective element configurations and message expression modes shown in the respective drawings are examples for the purpose of aiding understanding of the disclosure, and are not intended to limit the disclosure to configurations illustrated in the drawings. In the following description, "A and/or B" is used to indicate at least 1 of A or B.

For example, in each of the abovementioned example embodiments a description has been given centered on using a plurality of learning models in accordance with usage condition, but it is also possible to change determination threshold in the determination part 103 described above, in accordance with usage condition. For example, in a case of using learning model A, which assumes usage at foreign mail customs post office A, at foreign mail customs post office A, a determination threshold of 50% is assumed as a threshold for determining whether or not 1 or more articles is included, but in a case of using learning model A at other foreign mail customs post offices, it is also possible to have another value as the determination threshold. Similarly, it is also possible to change not only the learning model but also determination threshold in accordance with season or sender location, and to increase overall determination accuracy.

In the abovementioned respective example embodiments, a description is given in which sorting support apparatuses 100, 100a, 100-1, 100-2 select 1 learning model, but these sorting support apparatuses may select a plurality of learning models to perform determination. For example, by creating a learning model for each prohibited article, and the sorting support apparatus 100 performing an inspection of these prohibited articles in order, it is possible to implement the inspection without compromising the organization.

In the abovementioned respective example embodiments, a description is given in which a usage condition of the sorting support apparatus 100 is set by the operation terminal 180, but modes in which the sorting support apparatus 100 specifies a usage condition are not limited thereto. For example, instead of setting by the abovementioned operation terminal 180, it is possible to employ a mode in which a usage condition is set according to transmission of a message or e-mail including information for setting of usage condition to the sorting support apparatus 100. For example, a configuration may also be employed in which the sorting support apparatus 100 itself makes a query to a network or information set therein, determines a usage condition indirectly specifies by this information, and selects a learning model.

In the abovementioned respective example embodiments, a description is given citing examples of using the sorting support apparatus of the present disclosure in sorting a package at a foreign mail customs post office, but usage of the sorting support apparatus of the present disclosure is not limited to these examples. By providing a required learning model, application is also possible, for example, to inspection of packages at a collection location of a national distributor or an airline.

For example, a lithium battery specified as an airline hazardous substance may be enclosed with a small sized home appliance, but according to the present disclosure, in a check when an article is received at a shop or at an X-ray inspection at an airport, by using a learning model optimized for detecting a lithium battery from among a plurality of learning models, detection can be carried out efficiently.

Figure 11:
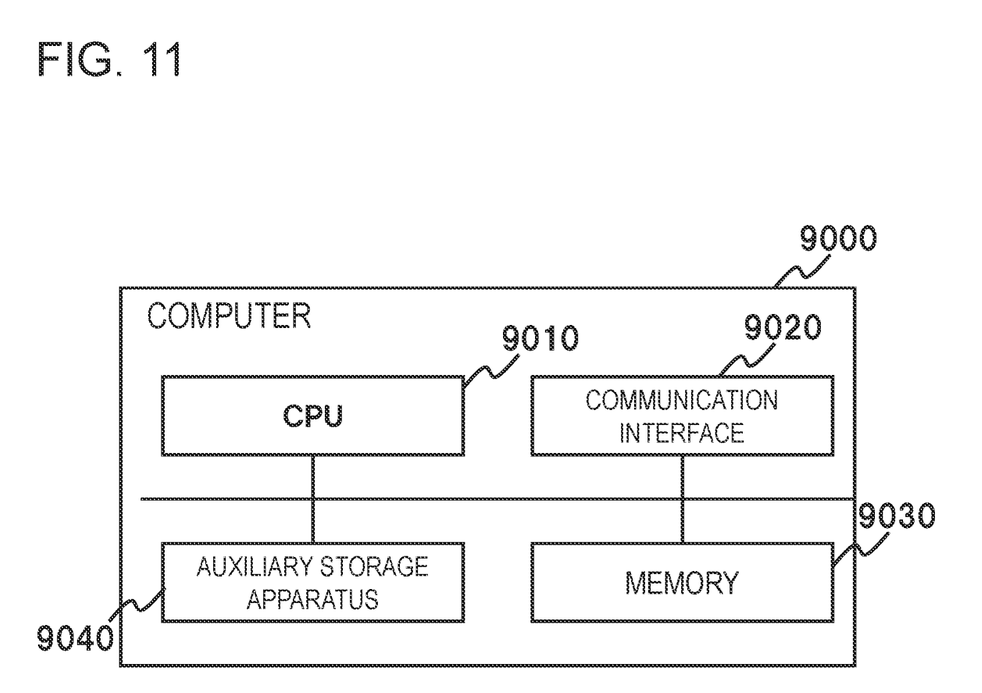
FIG. 11 is a diagram showing a configuration of a computer configuring the sorting support apparatus of the disclosure.

The procedure illustrated in the abovementioned first to fourth example embodiments may be realized by a program that causes a computer (9000 in FIG. 11) functioning as the sorting support apparatus to realize functionality as a sorting support apparatus. Such a computer is exemplified in a configuration provided with a CPU (Central Processing Unit) 9010, a communication interface 9020, a memory 9030, and an auxiliary storage apparatus 9040, in FIG. 11. Namely, a determination program that uses a learning model or a selection program for a learning model may be executed in the CPU 9010 of FIG. 11, and update processing of respective calculated parameters held in the auxiliary storage apparatus 9040 may be implemented.

That is, the respective parts (processing means, functions) of the sorting support apparatus illustrated in the abovementioned first to fourth example embodiments may be implemented by a computer program that causes the abovementioned respective processing to be executed in a processor installed in the sorting support apparatus, using hardware thereof.

Finally, preferred modes of the present disclosure are summarized.

<First Mode>
(Refer to the Sorting Support Apparatus According to the First Aspect Described Above.)
<Second Mode>
In the sorting support apparatus, the learning model is preferably created in accordance with a trend of handled goods at a location where the sorting support apparatus is disposed.
<Third Mode>
In the sorting support apparatus, the learning model is preferably created in accordance with a trend of handled goods at a time-period when sorting is performed.
<Fourth Mode>
In the sorting support apparatus, the learning model is preferably created in accordance with a trend of handled goods according to sender location.
<Fifth Mode>
In the sorting support apparatus, it is preferable to be able to change a threshold for determining, in the determination part, whether or not the at least one article is included.
<Sixth Mode>
(Refer to the Sorting Support System According to the Second Aspect Described Above.)
<Seventh Mode>
(Refer to the Sorting Support Method According to the Third Aspect Described Above.)
<Eighth Mode>
(Refer to the Program According to the Fourth Aspect Described Above.)

It is to be noted that the abovementioned sixth to eighth modes may be expanded with regard to the second to fifth modes, similar to the first mode.

It is to be noted that the various disclosures of the abovementioned Patent Literature and Non-Patent Literature are incorporated herein by reference thereto. Modifications and adjustments of example embodiments and examples may be made within the bounds of the entire disclosure (including the scope of the claims) of the present disclosure, and also based on fundamental technological concepts thereof. Various combinations and selections of various disclosed elements (including respective elements of the respective claims, respective elements of the respective example embodiments and examples, respective elements of the respective drawings and the like) are possible within the scope of the disclosure of the present disclosure. That is, the present disclosure clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

REFERENCE SIGNS LIST

10 sorting support apparatus
11, 101 input part
12, 102 storage part
13, 103 determination part
100, 100a, 100-1, 100-2 sorting support apparatus
104 X-ray camera
105 sender location recognition part
170 rotating light
180 operation terminal
190 belt conveyor
300, P1-P3 package
9000 computer
9010 CPU
9020 communication interface
9030 memory
9040 auxiliary storage apparatus

The invention claimed is:

1. A sorting support system wherein a plurality of sorting support apparatuses are disposed at multiple stages, each of the sorting support apparatuses comprising:
   at least one memory storing a computer program; and
   at least one processor configured to execute the computer program to:
     input a transmission image obtained by radiating an inspection target with electromagnetic waves; and
     determine whether or not one or more articles used under a specified usage condition are contained in the inspection target, wherein
     a first soring support apparatus for the articles used under the usage condition whose risk is equal to or more than a criterion is disposed on a front side of a second sorting support apparatus for the articles used under the usage condition whose risk is less than the criterion,
   wherein the specified usage condition is associated with a trend of handled goods at a location where the sorting support apparatus is disposed.

2. A sorting support system wherein a plurality of sorting support apparatuses are disposed at multiple stages, each of the sorting support apparatuses comprising:
   at least one memory storing a computer program; and
   at least one processor configured to execute the computer program to:
     input a transmission image obtained by radiating an inspection target with electromagnetic waves; and
     determine whether or not one or more articles used or a specified usage condition are contained in the inspection target,
   wherein a first sorting support apparatus for the articles used under the usage condition whose risk is equal to or more than a criterion is disposed on a front side of a second sorting support apparatus for the articles used under the usage condition whose risk is less than the criterion, and
   wherein the specified usage condition is associated with a trend of handled goods in a time-period in which sorting is performed.

3. A sorting support system wherein a plurality of sorting support apparatuses are disposed at multiple stages, each of the sorting support apparatuses comprising:
- at least one memory storing a computer program; and
- at least one configured to execute the computer program to:
  - input a transmission image obtained by radiating target with electromagnetic waves; and
  - determine whether or not one or more articles used under a specified usage condition are contained in the inspection target,
- wherein a first sorting support apparatus for the articles used under the usage condition whose risk is equal to or more than a criterion is disposed on a front side of a second sorting support apparatus for the articles used under the usage condition whose risk is less than the criterion, and
- wherein the specified usage condition is associated with a trend of handled goods according to sender location.

4. A sorting support method, performed by each of a plurality of sorting support apparatuses disposed at multiple stages, the sorting support method comprising:
- inputting a transmission image obtained by radiating an inspection target with electromagnetic waves; and
- determining whether or not one or more articles used under a specified usage condition are contained in the inspection target,
- wherein a first sorting support apparatus for the articles used under the usage condition whose risk is equal to or more than a criterion is disposed on a front side of a second sorting support apparatus for the articles used under the usage condition whose risk is less than the criterion, and
- wherein the specified usage condition is associated with a trend of handled goods at a location where the sorting support apparatus is disposed.

5. A sorting support method, performed by each of a plurality of sorting support apparatuses disposed at multiple stages, the sorting support method comprising:
- inputting a transmission image obtained by radiating an inspection target with electromagnetic waves; and
- determining whether or not one or more articles used under a specified usage condition are contained in the inspection target,
- wherein a first sorting support apparatus for the articles used under the usage condition whose risk is equal to or more than a criterion is disposed on a front side of a second sorting support apparatus for the articles used under the usage condition whose risk is less than the criterion, and
- wherein the specified usage condition is associated with a trend of handled goods in a time-period in which sorting is performed.

6. A sorting support method, performed by each of a plurality of sorting support apparatuses disposed at multiple stages, the sorting support method comprising:
- inputting a transmission image obtained by radiating an inspection target with electromagnetic waves; and
- determining whether or not one or more articles used under a specified usage condition are contained in the inspection target,
- wherein a first sorting support apparatus for the articles used under the usage condition whose risk is equal to or more than a criterion is disposed on a front side of a second sorting support apparatus for the articles used under the usage condition whose risk is less than the criterion,
- wherein the specified usage condition is associated with a trend of handled goods according to sender location.

7. A computer-readable non-transitory recording medium recording a program, the program causing a computer of each of a plurality of sorting support apparatuses disposed at multiple stages to perform;
- inputting a transmission image obtained by radiating an inspection target with electromagnetic waves; and
- determining whether or not one or more articles used under a specified usage condition are contained in the inspection target,
- wherein a first sorting support apparatus for the articles used under the usage condition whose risk is equal to or more than a criterion is disposed on a front side of a second sorting support apparatus for the articles used under the usage condition whose risk is less than the criterion, and
- wherein the specified usage condition is associated with a trend of handled goods at a location where the sorting support apparatus is disposed.

8. A computer-readable non-transitory recording medium recording a program, the program causing a computer of each of a plurality of sorting support apparatuses disposed at multiple stages to perform:
- inputting a transmission image obtained by radiating an inspection target with electromagnetic waves; and
- determining whether or not one or more articles used under a specified usage condition are contained in the inspection target,
- wherein a first sorting support apparatus for the articles used under the usage condition whose risk is equal to or more than a criterion is disposed on a front side of a second sorting support apparatus for the articles used under the usage condition whose risk is less than the criterion, and
- wherein the specified usage condition is associated with a trend of handled goods in a time-period in which sorting is performed.

9. A computer-readable non-transitory recording medium recording a program, the program causing a computer of each of a plurality of sorting support apparatuses disposed at multiple stages to perform:
- inputting a transmission image obtained by radiating an inspection target with electromagnetic waves; and
- determining whether or not one or more articles used under a specified usage condition are contained in the inspection target,
- wherein a first sorting support apparatus for the articles used under the usage condition whose risk is equal to or more than a criterion is disposed on a front side of a second sorting support apparatus for the articles used under the usage condition whose risk is less than the criterion, and
- wherein the specified usage condition is associated with a trend of handled goods according to sender location.

* * * * *